United States Patent [19]
Russell

[11] Patent Number: 5,651,086
[45] Date of Patent: Jul. 22, 1997

[54] TRILAMINAR DUAL REFLEX LIGHT GUIDE

[75] Inventor: James C. Russell, Bellevue, Wash.

[73] Assignee: The Boeing Company, Seattle, Wash.

[21] Appl. No.: 477,732

[22] Filed: Jun. 7, 1995

[51] Int. Cl.[6] ............................................. G02B 6/10
[52] U.S. Cl. ..................... 385/146; 385/121; 385/131; 385/133; 385/901
[58] Field of Search ..................... 385/146, 131, 385/129, 133, 147, 901, 121, 34

[56] References Cited

U.S. PATENT DOCUMENTS

| | | | |
|---|---|---|---|
| 4,730,895 | 3/1988 | Siedband et al. | 385/121 |
| 5,132,530 | 7/1992 | Groh et al. | 385/121 |
| 5,159,699 | 10/1992 | De Monts | 385/131 |
| 5,355,249 | 10/1994 | Souda et al. | 385/34 |
| 5,357,592 | 10/1994 | Neilson | 385/147 |
| 5,361,160 | 11/1994 | Normandin et al. | 385/131 |

*Primary Examiner*—Rodney B. Bovernick
*Assistant Examiner*—Yisun Song
*Attorney, Agent, or Firm*—John C. Hammar

[57] ABSTRACT

Three-layer light guide transports light from a source of low aspect ratio (e.g. nearly circular or nearly square) to one of high aspect ratio (e.g. narrow slit) to produce an output beam of low output divergence angles at high transfer efficiency. The design principle eliminates tapers or bends in the guide surfaces. Thereby, light from a conventional round lamp may be redirected with high optical efficiency to an aperture constrained to a long, narrow area, as in a slit headlight, a nacelle-rim light, a radome-edge light, or a landing light embedded in a wing having a sharp leading edge. The resulting far field intensity pattern is similar to that of a conventional sealed beam lamp.

10 Claims, 1 Drawing Sheet

TRILAMINAR DUAL REFLEX LIGHT GUIDE

REFERENCE OF GOVERNMENT RIGHTS IN THE INVENTION

The United States government has certain rights in this invention pursuant to Contract No. DAAE 07-93-C-R114.

TECHNICAL FIELD

The present invention relates to a light guide designed to transfer optical energy efficiently from a source of low aspect ratio to a high aspect ratio aperture, such as a narrow slit.

BACKGROUND ART

There are situations where high intensity light beams with restricted aperture geometry are desirable, but connecting a conventional incandescent lamp/reflector assembly having a low aspect ratio (i.e., the width of the aperture is comparable to the height) to a narrow slit having a high aspect ratio (i.e., the width of the aperture is large relative to the height) without significant optical losses has been difficult to achieve while maintaining farfield intensity. For example, the circular lamp lens can be taped or painted to create a narrow slit, but in doing so, most of the light energy would be lost. Conventional tapered or fiber optic light guides produce divergent output beams. The present invention is a simple and practical light guide to efficiently couple light from a low aspect ratio source, like a circular sealed beam lamp, to a high aspect ratio (narrow slit) aperture.

Obtaining optimum optical efficiency in such coupling has plagued other prior art solutions. Fiber optic light guides, bundles of fibers or small diameter transparent rods functioning as light guiding fibers, internally reflective tubes, or various configurations of bent and twisted transparent slabs all offer generally poor optical efficiency because they cause the output to spread or to diverge. These prior art solutions rely upon a multitude of internal reflections. Each reflection, however, alters the eventual emergent angle of the reflected ray so that a collimated input will be converted to a widely divergent output. This output would provide reduced levels of energy/unit area in the far field. Such a light would be a poor headlight because of its short range. An example of this type of light is shown in U.S. Pat. No. 2,704,321. The result is not a narrow beam of light with high intensity in the far field.

U.S. Pat. No. 5,276,592 discloses a high aspect ratio source that relies on a plurality of lenses and mirrors to distribute light from a small light source to a narrow, forward-directed aperture. Such a lens system is expensive to manufacture and difficult to align. It relies on an internal, small source rather than accepting a large diameter beam from a separate source. The present invention provides a unitary, plastic light guide to produce the desired conversion of an external light source to a high aspect ratio aperture.

SUMMARY OF THE INVENTION

The present invention is a unitary, plastic light guide intended to redistribute incident light from a low aspect ratio source (such as a square or circular beam) into a high aspect ratio output (i.e., a narrow slit) while retaining collimation of the light and optical efficiency so that the narrow slit provides relatively high energy/unit area in the far field, comparable to a conventional sealed beam lamp. The insertion loss or optical penalty associated with introducing a guide between the source and aperture is lower with the guide of the present invention than with any other guide with which we are familiar.

The present invention typically achieves this result by dividing the input aperture into three zones, a top, middle, and bottom. Light entering the middle zone passes directly through the light guide while light entering the top and bottom zones is reflected twice to become, respectively, output beams to the right and left of the middle beam. In this way, for example, light entering a 3×3 array, for purposes of discussion, would be redistributed as a 1×9 beam with light in the 1×3 bottom zone emitted on the right of the slit; light in the 1×3 middle zone emitted in the middle of the slit, and light in the 1×3 top zone emitted on the left of the slit. Dual lateral reflection with vertical translation retains the desired collimation.

DETAILED DESCRIPTION OF A PREFERRED EMBODIMENT

The present invention is a unitary, plastic light guide intended to redistribute with high optical efficiency light energy from a low aspect ratio source to a high aspect ratio output using dual reflection for translating the energy in a top and a bottom zone into energy in two zones laterally adjacent to the non-translated central zone. By minimizing the number of reflections, the emitted energy in all the zones remains substantially collimated during the redistribution so that the energy/unit area remains high in the far field.

Preferably the light guide is made from optically clear plastic, such as PLEXIGLAS (methyl methacrylate) or LEXAN (polycarbonate) with conventional mirror surfaces reflective to the visible spectrum.

We could redistribute the light entering the top or bottom zones using total internal reflection rather than mirror surfaces. Also, the guide might actually be a device to accurately position separate mirrors in correct relationship in free space rather than a solid light guide. In the separate mirror embodiment, the light would pass through the air. A solid light guide assures that the mirrors or reflective surfaces retain their proper alignment. It also protects against inadvertent blockage of light by an impediment falling between the mirrors.

Figure 1:
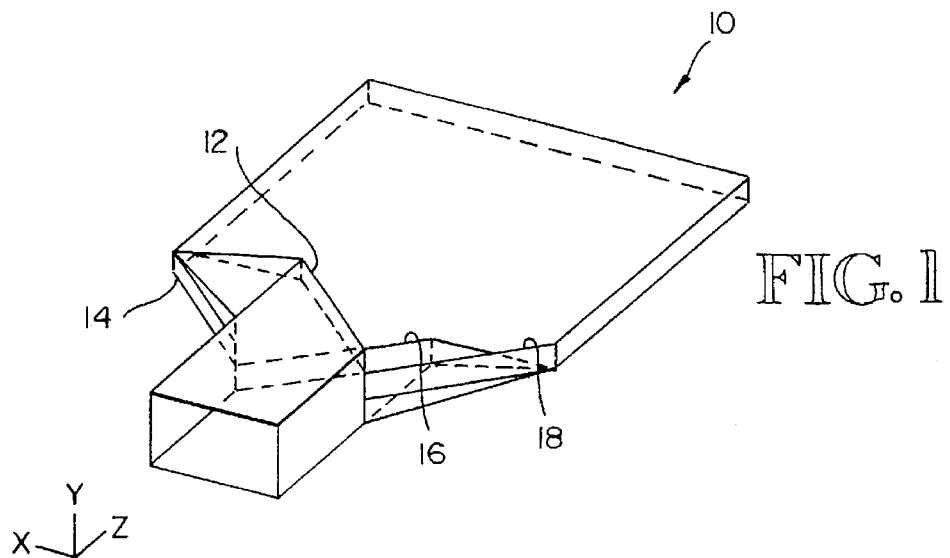
FIG. 1 is a schematic perspective of a preferred embodiment of the light guide of the present invention.
Figure 2:
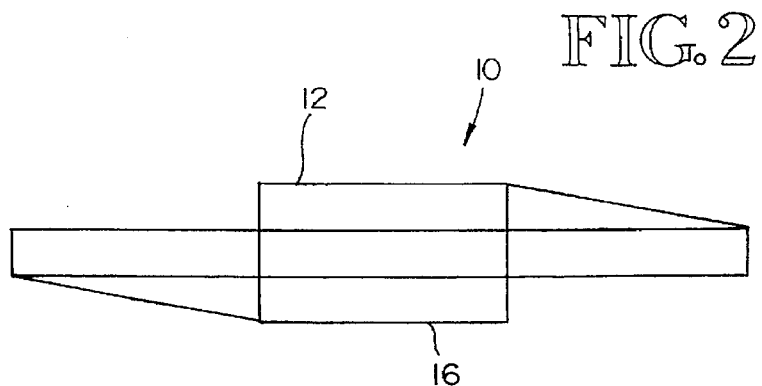
FIG. 2 is a front elevation of the light guide of FIG. 1.
Figure 3:
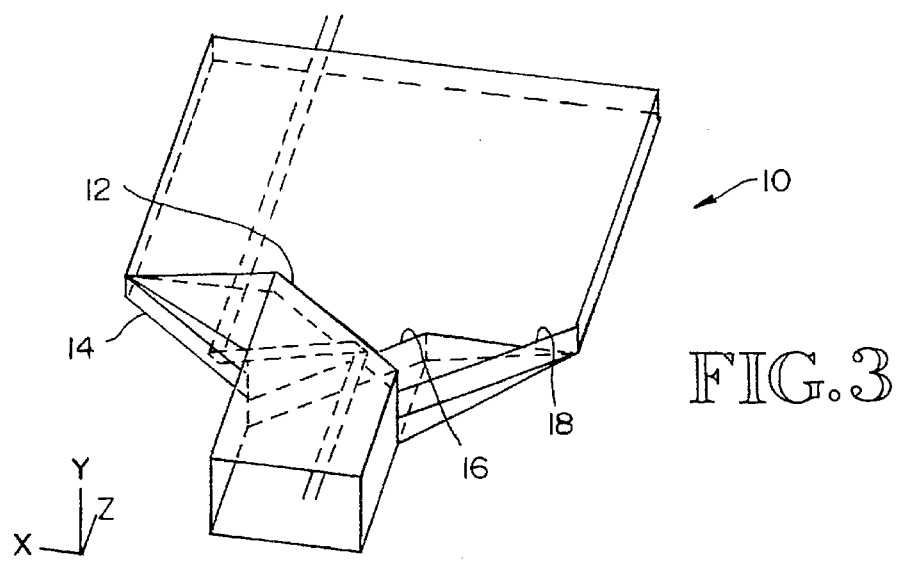
FIG. 3 is a perspective schematic illustrating dual reflection of light entering the top zone of the guide to produce the left portion of the emitted beam.

In the illustrated example, the light guide 10 has mirror surfaces 12 and 14 (FIG. 3) to redistribute light from the top zone to the left output zone. The right output zone is created in a similar manner using the mirror surfaces 16 and 18. In the illustrated example, the mirror surfaces 12 and 16 are at an angle of about 45 degrees from the X axis in the X-Z plane and about 7 degrees with respect to the Y axis in the Y-Z plane. The mirrors 14 and 18 complement mirrors 12 and 16 to produce the desired coaxial light path, forming a seamless high aspect ratio aperture.

While described with respect to a 3×3 square input, the invention is adaptable to other arrangements. If the input is rectangular such as 3×4 or 3×5, the output will simply be broader such as 1×12 or 1×15. The split need not be equal. That is, the output slit might be stepped so that the laterally symmetric output zones are either taller or shorter than the center, such as 2×3:1×3:2×3 or 1×3:2×3:1×3. Or, if the height dimensions are different in the input zones, the output zones might be clipped (with the consequent loss of optical efficiency) rather than completely transmitted. That is, some of the light in the top and bottom zones may be allowed to miss the mirrors, so that the input beam is effectively vignetted.

The redistribution may have more than three zones, but adding zones makes fabrication more difficult without significantly improving performance and makes the geometry more complicated. I prefer three zones, as shown, of substantially equal height.

Aside from the four mirrored surfaces 12, 14, 16, and 18, the guide functions to constrain light energy using total internal reflection of light which may enter off angle. Such light will lead to dispersion to some degree when emitted, but such light would miss the mirrors entirely in the prior art designs which are mirrors spaced a part in free space.

The mirrored surfaces are easily formed because they are adjacent to machined or cast edges of the light guide, although they may be protected with overcoats to keep them from scratching or eroding. The construction may be made rugged so as not to require realignment in use.

The light guide of the present invention produced energy/unit area in the far field nine times greater than the next best guide (a bent slab design) that was tested, so the present invention offers an order of magnitude improvement over prior art devices.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

I claim:

1. A light guide for efficiently redistributing light from a low aspect ratio source to a high aspect ratio aperture, comprising:

(a) a plastic, transparent light guide having at least a top zone, a middle zone, and bottom zone for receiving input light from the source, each zone being substantially congruent with the other zones and having a characteristic length L and width W, the zones being stacked such that they define an aspect ratio of substantially 1/3 (L/W);

(b) a first tilted mirror surface within the light guide to redirect light entering in the top zone of the light guide as a first lateral output band horizontally beside the middle zone;

(c) a second tilted mirror surface within the light guide to redirect light entering in the bottom zone of the light guide as a second lateral output band horizontally beside the middle zone; and (d) two mirror surfaces in the middle zone of the light guide for reflecting light directed from either the top or bottom zone forward to form a combined collimated output with light from the top and bottom zones redirected through the double reflection respectively to the left or right lateral output band of the middle zone, the output bands together forming the aperture with an aspect ratio substantially of 3 (L/W).

2. A method for providing relatively high optical intensity per unit area in the far field by redistributing light emitted from a low aspect ratio source with a solid, transparent light guide into a high aspect ratio output, comprising the steps of:

(a) dividing the source into at least three zones: a top zone, a middle zone, and a bottom zone, the zones being vertically stacked in relationship to one another and covering essentially the entire area of the source; and (b) using only two reflections within the light guide to redirect light in the top and bottom zones into lateral output bands substantially horizontally aligned beside the middle zone, the output bands forming a seamless high aspect ratio aperture.

3. The method of claim 2 wherein the three zones are substantially congruent in shape with a characteristic length L and a characteristic width W such that the redistribution occurs from a source of aspect ratio substantially 1/3 (L/W) to an output having an aspect ratio of 3 (L/W).

4. The method of claim 2 further comprising the steps of:

substantially collimating the light with the reflections to produce the high intensity output in the far field.

5. The light guide of claim 1 wherein the plastic is transparent to the visible spectrum.

6. The light guide of claim 1, wherein the plastic is methyl methacrylate or polycarbonate.

7. The light guide of claim 6 wherein the mirror surfaces are deposited on surfaces of the plastic.

8. The light guide of claim 1 wherein L is substantially equal to W.

9. The light guide of claim 1 wherein L is larger than W.

10. The method of claim 2 wherein light from the source misses the top or bottom zone so that the input beam is effectively vignetted.

* * * * *